United States Patent [19]

Waddill et al.

[11] Patent Number: 4,931,528

[45] Date of Patent: Jun. 5, 1990

[54] 1-ISOPROPYL-2-METHYL IMIDAZOLE AS AN EPOXY RESIN CURATIVE

[75] Inventors: Harold G. Waddill; George P. Speranza; Wei-Yang Su, all of Austin, Tex.

[73] Assignee: Texaco Chemical Company, White Plains, N.Y.

[21] Appl. No.: 348,824

[22] Filed: May 8, 1989

[51] Int. Cl.$^5$ .................... C08G 59/68; C08G 59/50
[52] U.S. Cl. .................................. 528/94; 528/117; 528/407; 528/408
[58] Field of Search ................ 528/94, 117, 407, 408

[56] References Cited

U.S. PATENT DOCUMENTS

| | | | |
|---|---|---|---|
| 3,394,105 | 7/1968 | Christie | 528/94 |
| 3,507,831 | 4/1970 | Avis et al. | 528/94 |
| 3,634,323 | 1/1972 | Moran | 528/94 |
| 4,529,537 | 7/1985 | Dockner et al. | 528/94 X |
| 4,732,962 | 3/1988 | Atkins et al. | 528/94 |

FOREIGN PATENT DOCUMENTS 1373779  11/1974  United Kingdom .

*Primary Examiner*—Earl Nielsen
*Attorney, Agent, or Firm*—Jack H. Park; Kenneth R. Priem; Cynthia L. Kendrick

[57] ABSTRACT

Disclosed is an epoxy resin curative exhibiting extended pot life, increased resistance to heat and chemicals, lower reactivity at ambient temperatures and increased reactivity at moderately elevated temperatures which comprises from 1 to 5 parts by weight of 1-isopropyl-2-methyl imidazole per 100 parts by weight epoxy resin. The latent reactive properties make the curative potentially useful in a variety of applications.

5 Claims, No Drawings

1-ISOPROPYL-2-METHYL IMIDAZOLE AS AN EPOXY RESIN CURATIVE

BACKGROUND OF THE INVENTION

CROSS-REFERENCE

This application is related to U.S. Application Serial No. 07/284,884 filed Dec. 15, 1988.

FIELD OF THE INVENTION

This invention relates to epoxy resin curing agents. More particularly this invention relates to the use of small amounts of 1-isopropyl-2-methyl imidazole in curing a variety of epoxy resins to provide materials with a high degree of heat and chemical resistance. Further this novel curative demonstrates different reactivities over a range of temperatures, thus providing a variety of application possibilities.

RELATED ART

Epoxy resins include a broad class of polymeric materials having a wide range of physical properties. The resins are characterized by epoxide groups which are cured by reaction with certain catalysts or curing agents to provide cured epoxy resin compositions with various desirable properties.

The most common epoxy resins are condensation products of epichlorohydrin and bisphenol A. These systems can be cured with conventional curing agents such as polyamines, polycarboxylic acids, anhydrides and Lewis acids. Bisphenol A based epoxy compositions, when cured, have good adhesive properties, however many are inherently stiff and brittle and hence their use is limited to applications where peel forces do not come into play.

It is known in the art to use substituted imidazoles as curing agents for epoxy resins. In [95] Chemical Week, July 31, 1965 it is stated imidazoles generally offer, when used at low concentration, DT's to 150° C. with DGEBA and other elevated-temperature properties in the range expected of aromatic amine cures. This improved heat resistance is obtained with a super-cooled liquid having a viscosity cf 4000 to 8000 centipoises and providing a long pot life. Generally, imidazoles are in solid form and cause predictable results with the resin to be cured. For instance, one could expect a substantial amount of gelling of the resin at lower temperatures.

In Jpn. Kokai Tokkyo Koho JP No. 62,100,518 [87,100,518] to Somar Corporation, Kawa and Nakamura disclose the use of a compound of the formula:

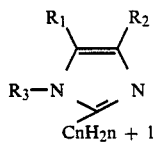

where $R_{1-3}$=H, lower alkyl or an aryl group and n=10-20, which is combined with dicyanamide and epoxy resins in solution to produce stable prepegs. However this reference does not suggest 1-isopropyl-2-methyl imidazole as an epoxy resin curative.

In Jpn. Kokai Tokkyo Koho JP No. 62,198,668 [87,198,668] (Cl. C07D233/61), 02 Sept. 1987, imidazoles are prepared from 1-(acylaminoethyl)imidazolines and used for curing epoxy resins.

In U.S. Pat. No. 4,732,962, Atkins et al. disclose an epoxy tooling composition for use in cast-to-size forming tools consisting essentially of Bisphenol-A epoxy, a trifunctional aromatic epoxy, an anhydride curing agent and an imidazole catalyst. Here the imidazole accelerator was 1-(2-hydroxypropyl)-2-methylimidazole.

New curing agents for epoxy resins are useful and desirable, especially if they demonstrate improved properties. It would be an advance in the art to provide an imidazole epoxy resin curing agent which was a liquid with low viscosity, rather than solid, and one which would mix well with epoxy resin. It would also be very economical if an effective curing amount consisted of a very small amount by weight. Further it would be an advance in the art if the curative mixed in the resin resulted in a compatible mixture with an extended pot life. If a curative with the above properties also allowed for variations in reactivity over a broad range of temperatures, this would be particularly desirable and a variety of potential applications would be apparent to those skilled in the art.

It has now been discovered that 1-isopropyl-2-methyl imidazole can be employed in liquid form as an epoxy resin curative to provide these and other desirable properties.

SUMMARY OF THE INVENTION

The present invention is directed to a novel imidazole, 1-isopropyl-2-methyl imidazole, and to its use as a curative of epoxy resins. This low viscosity liquid imidazole used as an epoxy resin curative in only small amounts at moderate temperatures, provides materials with a high degree of heat and chemical resistance.

It has also been discovered that a low rate of reactivity is observed at ambient temperatures and an increased rate of reactivity is observed at moderately elevated temperatures, thus providing the potential use of the imidazole in a variety of areas of application.

DETAILED DESCRIPTION

The imidazole used as a curing agent of uncured epoxy resins in the present invention is a member of a group of imidazoles having the following general formula:

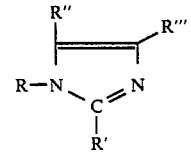

wherein R is H or an alkyl group containing 1 to 18 carbon atoms, R' is H or an aromatic or alkyl group containing 1 to 17 carbons, R" is H or an alkyl group containing 1–4 carbon atoms, and R''' is H or an alkyl group containing 1–4 carbon atoms.

In the instant invention it has been discovered that a particular imidazole, 1-isopropyl-2-methyl imidazole demonstrates properties which make it particularly valuable as a curing agent. This novel imidazole has been produced in high yields by a process disclosed in related copending Application Ser. No. 07/284,884 incorporated herein by reference. The structure can be represented as follows:

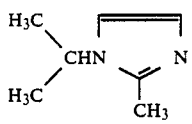

The 1-isopropyl-2-methyl imidazole of the instant invention is prepared by a method comprising dehydrogenation of imidazolines over a catalyst consisting of nickel in combination with from 2 to 30 wt % copper or chromium alone or in combination, at a temperature of 160° C. to 250° C. and a pressure of atmospheric to 500 psig. The 1-isopropyl-2-methyl imidazole demonstrates the following desirable properties:

1. It is easier to handle than most imidazoles, since it is a liquid.
2. It exhibits a higher boiling point as a liquid (217° C.).
3. It possesses a low viscosity, similar to water, and much lower than found in other imidazoles.

When the 1-isopropyl-2-methyl imidazole is combined in small amounts with the epoxy resin it results in a curing system which exhibits the following desirable properties:

1. It reacts faster at lower temperatures. Therefore, the system requires less energy because it cures rapidly at just slightly elevated temperatures and reaches a cured state rapidly.
2. The cured composition demonstrates improved strength properties. (The data in Example 2 shows that even after a short period of time a material having satisfactory properties is obtained and as the length of curing time increases from 30 minutes to 10 hours, the heat distortion increases.
3. It exhibits improved resistance to boiling water or acetone.

Products possessing such desirable properties are useful in a number of applications, such as coatings, adhesives, encapsulations, laminates, composite fabrications and sealants.

An epoxy resin which may be cured by the process of this invention may typically be one prepared, for example, by the reaction of Bisphenol A with epichlorohydrin in the presence of sodium hydroxide. After condensation is complete, the crude resin is freed of residual epichlorohydrin, washed well to remove salt and soluble by-products, and recovered. Among those which have demonstrated the effectiveness of the instant invention are diglycidyl ethers of Bisphenol A, such as liquid epoxy resin EEW≈185 (EEW=epoxy equivalent weight; molecular weight of resin=≈380; functionality ≈2; equivalent weight ≈185-192).

Epoxy resin is normally used without dilution and without other additives. The curing agent in this case is liquid. Usually imidazoles are solids. It was only necessary to add a small amount of the 1-isopropyl-2-methyl imidazole to the epoxy resin in order to effect curing.

The novel imidazole curative should be present in the epoxy resin in an amount sufficient to provide 1 to 5 parts by weight (pbw) of novel imidazole curing agent per 100 parts by weight epoxy resin.

Incomplete curing may be accomplished under ambient conditions. Heating will be necessary to cure fully. When the curing is accomplished at ambient conditions the system exhibits what could be described as "latent" reaction properties. The curing does not take place as rapidly a&: about room temperature, but can be speeded by elevating the temperature moderately. The reaction takes place faster at moderately elevated temperatures, such as 100-160° C. This can be a very desirable property for certain uses.

Curing takes place over a period of 0 to 36 hours. Optimum physical properties developed using extended cure times (4-10 hours) and an elevated temperature.

Practice of the novel method of this invention is apparent from the procedures exemplified in Examples 1, 2 and 3. The method of curing epoxy resins with the imidazoles herein described allows for the production of compositions with properties which should have a variety of applications. Many properties which can be obtained by variations of the invention are demonstrated in Examples 1, 2 and 3.

Example 1 demonstrates the curing was more rapid with 1-isopropyl-2-methyl imidazole at 60° C., but was only slightly more rapid at the higher temperatures. Viscosity development at 23° C. was considerably more rapid with 1-isopropyl-2-methyl imidazole (IMIZ)/resin than with 1-methyl imidazole. It is also noted that the pot life of the IMIZ/resin was quite long. The mixtures of the Examples were mixed, degassed and poured into molds.

In the various Examples the following properties are measured:

Gel Time: Measured in minutes (g mass) (ASTM 2471)
Brookfield viscosity: (ASTM D-1824) Internal resistance to flow; ratio of shearing stress to rate of shear measured in centipoises at about 23° C. for different time periods.
Shore D hardness: (ASTM D-2240-81) Measured at 0 and at 10 seconds identation hardness with durometer.
HDT: (ASTM D) Heat distortion temperature is the temperature at which a polymer sample distorts under load upon heating under specified conditions. HDT's can also be used to indicate the degree of cross-linking or extent of cure of an epoxy resin.
Izod impact strength (ft-lb/in): Izod impact testing is carried out with a pendulum-type device where the test specimen is positioned as a cantilever beam with the notched side facing the striker. Five samples are tested for impact with each formulation with the average being recorded as IZOD impact strength.
Tensile Strength, psi The rupture strength (stress/strain product at break) per unit: area of material subjected to a specified dynamic load. "Ultimate tensile strength" is the force, at break, when a sample is pulled part.
Tensile Modulus, psi: Stress/strain
Flexural Strength, psi: A measure of the ability of a material to withstand failure due to bending.
Flexural modulus, psi: Stress/strain The examples are intended only as a means of illustration and are not to be construed as limitative.

EXAMPLE 1

Viscosity Development And Gel Times at Elevated Temperatures For Imidazole-Containing Epoxy Systems

| Formulation: | 6406 −59 | −67 | −61 |
| --- | --- | --- | --- |
| Liquid epoxy resin (EEW≈185-192) | 100 | 100 | 100 |
| 1-Isopropyl-2-Methyl imidazole | 3 | — | — |
| 1-Methyl imidazole | — | 2 | — |
| 2-Ethyl-4-Methyl imidazole | — | — | 4 |
| Gel time[1] at 60° C. | 89.6 | 135.8 | 155.9 |

-continued

| Formulation: | 6406-59 | -67 | -61 |
|---|---|---|---|
| 80° C. | 41.1 | 41.8 | 43.4 |
| 100° C. | 18.3 | 30.2 | 24.6 |
| 120° C. | 12.5 | 16.4 | 14.3 |
| 150° C. | 6.7 | 8.3 | 6.0 |
| Brookfield viscosity, cps, 23° C. | | | |
| Initial | 13200 | 12000 | 15600 |
| After 2 hours | — | 13200 | — |
| After 3 hours | — | 13400 | — |
| After 4 hours | 17200 | 15200 | — |
| After 5 hours | — | — | 20000 |
| After 6 hours | — | 16500 | — |
| After 7 hours | 18750 | 16600 | — |
| After 8 hours | — | — | 24500 |
| After 24 hours | 82500 | — | 149000 |
| After 25.5 hours | — | 38000 | — |
| After 27 hours | — | 43000 | — |
| After 28 hours | 123000 | 46000 | — |
| After 29 hours | — | — | 162000 |
| After 30 hours | 212000 | — | — |
| After 30.5 hours | — | 67000 | — |
| After 31 hours | — | — | 200000 |

[1]100 g of formulation added at 23° to gel timer container at the designated temperature. The formulated material was allowed to equilibrate to desired temperature and stirred until gellation.

EXAMPLE 2

Properties Of Epoxy Resin System Cured With 1-Isopropyl-2-Methyl Imidazole

| Formulation: | | | | |
|---|---|---|---|---|
| Liquid epoxy resin (EEW≈185-192) | | | 100 pbw | |
| 1-Isopropyl-2-Methyl imidazole | | | 3 pbw | |
| Properties of Cured | 6406-57 | | | |
| ⅛-inch Castings | E | F | G | H |
| Cured | 1 | 2 | 3 | 4 |
| Shore D hardness, 0-10 sec. | 88-85 | 86-84 | 88-86 | 87-85 |
| HDT, °C. 264 psi/ 66 psi load | 121/153 | 137/168 | 154/186 | 165/180 |
| Izod impact strength, ft-lb/in | 0.05 | 0.11 | 0.06 | 0.08 |
| Tensile strength, psi | 3700 | 5000 | 4600 | 3150 |
| Tensile modulus, psi | 443000 | 390000 | 331500 | 356000 |
| Elongation at break, % | 0.9 | 1.3 | 1.6 | 0.8 |
| Flexural strength, psi | 9100 | 8900 | 8800 | 8100 |
| Flexural modulus, psi | 458000 | 390000 | 346000 | 384000 |
| % Weight gain, | | | | |
| 24-hr. water boil | 1.3 | 1.1 | 0.9 | 1.2 |
| 3-hr. acetone boil | 0.09 | 0.01 | —(0.02)[5] | 0.01 |

[1]Cured 2 hours 80°, 0.5 hrs. 150° C.
[2]Cured 2 hours 80°, 1.0 hrs. 150° C.
[3]Cured 2 hours 80°, 4.0 hrs. 150° C.
[4]Cured 2 hours 80°, 10.0 hrs. 150° C.
[5]Weight loss Comment: At the concentration resulting inn optimum Tg (3 phr.), an IPMIZ-epoxy system required extended cure times (4-10 hours) at an elevated temperature (150° C.) in order to develop optimum physical properties (HDT). However, curing for shorter periods of time resulting in properties that were entirely satisfactory.

EXAMPLE 3

Properties Of Epoxy Resin System Cured With 1-Isopropyl-2-Methyl Imiazole

| Formulation: | | | | |
|---|---|---|---|---|
| Liquid epoxy resin (EEW≈185-192) | | | 100 pbw | |
| 1-Isopropyl-2-Methyl imidazole | | | 3 pbw | |
| Properties of Cured | 6406-57 | | | |
| ⅛-inch Castings | A | B | C | D |
| Cured | 1 | 2 | 3 | 4 |
| Shore D hardness, 0-10 sec. | 88-87 | 86-84 | 87-86 | 88-86 |
| HDT, °C. 264 psi/ 66 psi | 105/144 | 118/146 | 123/157 | 135/160 |
| Izod impact strength, ft-lb/in | 0.03 | 0.04 | 0.03 | 0.03 |
| Tensile strength, psi | 8000 | 5800 | 5400 | 5300 |
| Tensile modulus, psi | 442000 | 402500 | 408500 | 348000 |
| Elongation at break, % | 2.0 | 1.6 | 1.5 | 1.7 |
| Flexural strength, psi | 12600 | 11900 | 10400 | 10000 |
| Flexural modulus, psi | 497000 | 448000 | 460000 | 396000 |

[1]Cured 2 hours 80° C.
[2]Cured 2 hours 80°, 1.5 hrs. 120° C.
[3]Cured 2 hours 80°, 1.0 hrs. 120° C.
[4]Cured 2 hours 80°, 4.0 hrs. 120° C.

Comment: Further illustration of degree of curing at relatively low temperatures—only short period of time required at low temperature, i.e., 80° C. in order to develop satisfactory properties.

What is claimed is:

1. An epoxy resin curative composition characterized by lower reactivity at ambient temperatures and increasingly accelerated reactivity at moderately elevated temperatures, comprising:

(1) 1 to 5 parts by weight of 1-isopropyl-2-methyl imidazole, and
   (2) 100 parts by weight epoxy resin.

2. The composition of claim 1 wherein the epoxy resin is a diglycidyl ether of Bisphenol A having an epoxy equivalent weight (EEW) of 185 to 192.

3. The composition of claim 1 at a temperature of from about 50° C. to about 200° C.

4. The composition of claim 1 wherein the system is cured for from 30 minutes to 20 hours.

5. A method for curing an epoxy resin comprising the addition of 1 to 5 parts by weight of 1-isopropyl-2-methyl imidazole to 100 parts by weight epoxy resin at a temperature of from 50° C. to 200° C. for a period of 0 hours to 36 hours.

* * * * *